(12) United States Patent
Smith

(10) Patent No.: US 8,593,668 B2
(45) Date of Patent: Nov. 26, 2013

(54) PARALLEL PRINTING SYSTEM

(75) Inventor: Mark A. Smith, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 715 days.

(21) Appl. No.: 12/434,975

(22) Filed: May 4, 2009

(65) Prior Publication Data

US 2010/0277757 A1 Nov. 4, 2010

(51) Int. Cl.
*G06F 3/12* (2006.01)

(52) U.S. Cl.
USPC ........ 358/1.15; 358/1.18; 358/1.13; 707/764; 707/610

(58) Field of Classification Search
USPC ................ 358/1.18, 1.13, 1.15; 707/764, 610
See application file for complete search history.

(56) References Cited

U.S. PATENT DOCUMENTS

| | | | |
|---|---|---|---|
| 5,109,348 A * | 4/1992 | Pfeiffer et al. | 345/505 |
| 7,099,027 B1 | 8/2006 | Barry | |
| 7,161,705 B2 | 1/2007 | Klassen | |
| 2004/0196496 A1 | 10/2004 | Klassen | |
| 2004/0196497 A1 | 10/2004 | Klassen | |
| 2004/0196498 A1* | 10/2004 | Klassen | 358/1.15 |
| 2004/0197124 A1 | 10/2004 | Klassen | |
| 2005/0206917 A1* | 9/2005 | Ferlitsch | 358/1.5 |
| 2008/0309962 A1* | 12/2008 | Smith | 358/1.15 |

\* cited by examiner

*Primary Examiner* — Jacky X Zheng
(74) *Attorney, Agent, or Firm* — Fay Sharpe LLP

(57) ABSTRACT

A printing system comprised of a printer and a plurality of processing nodes wherein each processing node is disposed for processing a job file associated with a print job into a printer dependent format. The system further comprises a replicator component attached to the job file. The job file includes multiple instances of a raster image processing (RIP) wherein each RIP instance proposes to a collector component an RIP image for printing. The collector grants permission to image a page to a RIP proposal observed to the collector and then rejects the same proposals from other RIP components.

14 Claims, 1 Drawing Sheet

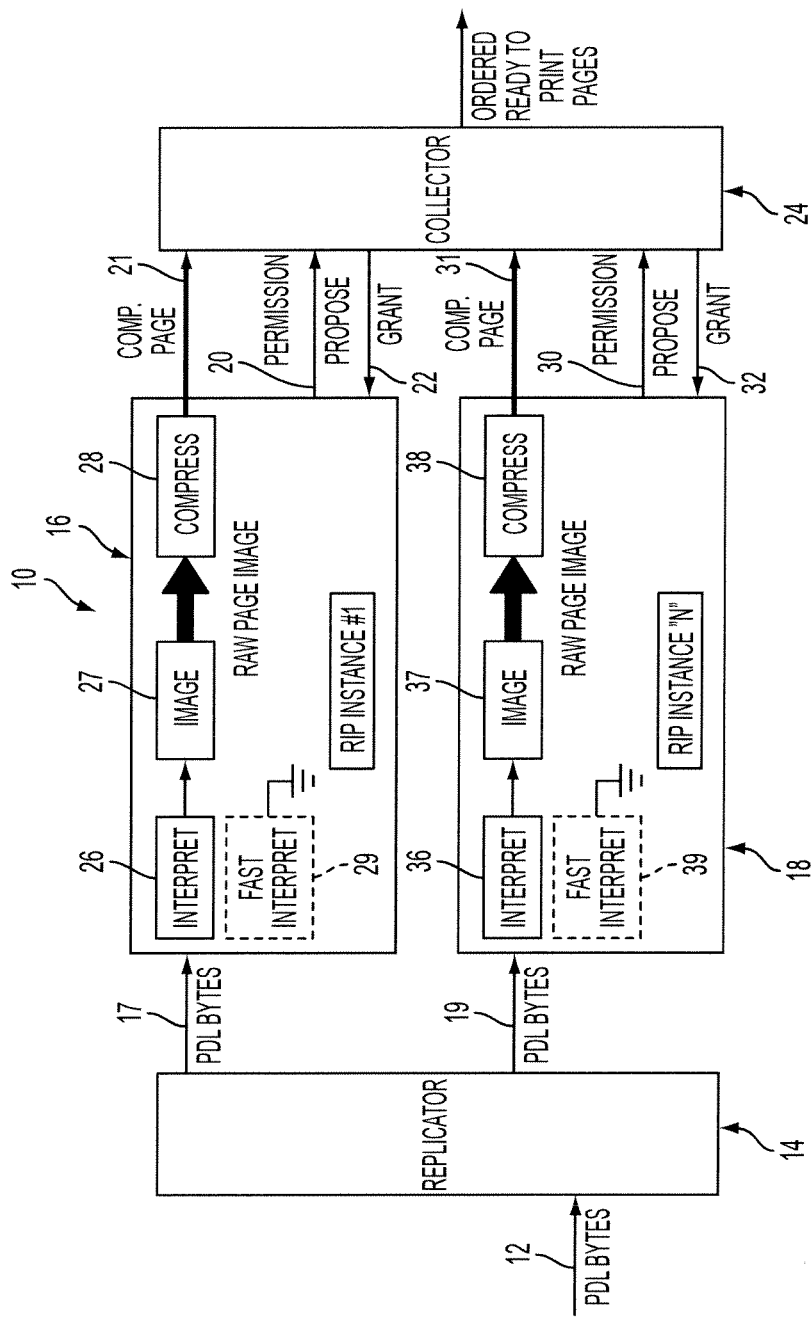

PARALLEL PRINTING SYSTEM

BACKGROUND

The subject disclosure relates to printing systems, their architecture and processing steps and, more particularly, to producing electronic images in a manner to drive digital printers more efficiently and faster.

Generating print-ready documents to be printed by a printing system involves acquiring the information (content, graphics, production specs, etc.) required to image, process and output the desired document in an electronic form understandable by a print engine. Such systems can range from those that are simple and modestly expensive such as are well known to consumer users of personal computer systems, up to commercial printing systems that are capable of generating in the range of one hundred pages per minute in full color. All systems though have a high level objective of printing faster. There are three general approaches which have been applied in the past for accomplishing this objective. First, faster serial processing methods suggest optimizing the software and using faster and more expensive processors. Second, job parallel processing sends separate jobs to separate systems and then prints them on a common printer. Third, Portable Document Format ("PDF") based page parallel systems convert the job to PDF, and then split the PDF file into pages which are converted to print ready form on multiple independent processors, with the job being printed on a common printer. Software optimization has its limits and faster processors are also limited by currently available technology. Job parallel processing results in poor single job performance, unpredictable job time and reduced throughput when there is only one long job in the queue. The existing PDF-based solutions are slow due to their need to often convert from a different input language into PDF and then write the PDF file into an input spool disk. Page parallel processing has suffered from the inefficiencies of a throughput disadvantage because per job overhead occurs on a per page or per chunk basis. In addition, some print jobs are not splittable or cannot be split into pages printed in a page independent sequence.

A more detailed description of a job parallel system is in U.S. Pat. No. 5,819,014 which describes a printer architecture using network resources to create a "distributed" printer controller or translator. By distributing the translators across the network, print jobs may be processed in parallel. Each job is formatted in the system in a particular data type comprising a Page Description Language ("PDL") such as a PostScript file, ASCII, PCL, etc. A distributed set of the translators is used for each data type, the translators each comprising a plurality of CPUs to simultaneously rasterize each data type. In real time operation, each translator on the network can formulate the rasterized image which is then fed over the network to the print engine. Job parallelism increases the flexibility of the printing system by allowing slow jobs to be processed while quicker jobs are completed and printing. However, it can be easily appreciated that where the jobs require substantially different processing times, waits will necessarily occur and overall system efficiency will suffer.

A well known commercially available system exploiting page parallelism is Adobe™ Extreme. In this system the data input for a print job is normalized into a PDF format and stored on disk. The PDF format is essentially page independent guaranteed and thus facilitates segregating the job into page units for page parallel processing. A "sequencer" processing node takes the PDF jobs off the disk and writes them back onto a disk again a page at a time as individual files, one file per page. Rasterizing image processing nodes (RIPs) then convert the files into a print-ready form acceptable by a print engine. It is important to note that in terms of processing efficiency, Adobe Extreme must access the disk twice, thus slowing the system down, and that the RIP nodes can only process a file consisting of a single page. Of course, an entire job may be limited to one page, but for purposes of setting the stage for the subject disclosure, when a job is comprised of several pages, Adobe Extreme must sequence it to individual pages only.

There are certain PDL files that are considered "non-splittable" by virtue of their language (e.g. PCL) or construction (e.g. non-DSC compliant PostScript). It is difficult to RIP such jobs at ever increasing rates by relying on improvements in processor speed, as computational vendors have focused their efforts on providing multiple-core CPUs rather than single CPUs with higher clock frequencies. "Non-splittable" PDLs cannot easily be processed by multiple RIPs running in parallel on these multiple core CPUs. The problem is presently addressed by 1) preprocessing the PDL file to convert it into a splittable PDL (e.g. PDF), or 2) preprocessing the PDL so as to create a series of instructions to direct the operation of RIPs operating in parallel on the PDL file or segments of the PDL file, or 3) by RIP coding improvements.

Accordingly, in the continuing need for improving efficiency and speed in printing systems, there is a need for a system which is not limited to mere job or page parallelism and that can facilitate control and data flow of a print job to the printing system that will obviate multiple accesses to a storage disk for any single job. The subject disclosure satisfies these needs and thus overcomes the problems specified above, as well as others.

BRIEF SUMMARY

Other advantages and benefits of the present disclosure will become apparent to those of ordinary skill in the art upon reading and understanding the following detailed description of the preferred embodiments.

The disclosure provides a printing system comprising a printer and a plurality of processing nodes, wherein each processing node is disposed for processing a job file associated with a print job into a printer dependent format. The system further provides a replicator component attached to the job file wherein the job file includes multiple instances of a raster image processing (RIP). Each RIP instance proposes to a collector component an RIP image for printing. The collector grants permission to image a page to a RIP proposal observed to the collector and then rejects the same proposals from other RIP components.

In another aspect of the disclosure, a method is provided for operating a printing system for parallel processing a print job with a plurality of processing nodes into a printer-ready format for the printing of the print job. The method comprises interpreting the print job as one print job replicated into a plurality of duplicates of the same one print job; RIPPING each duplicate print job in parallel wherein each one of a plurality of RIPS interprets every page of the print job; and, selectively imaging unique pages of the print job.

In still another aspect of the disclosure, a printing system is provided comprising a printer and a plurality of processing nodes, wherein each processing node being disposed for processing an entire job file associated with a print job into a printer dependent format. The system further provides a replicator component attached to the job file. The job file includes multiple instances of a raster image processing (RIP). Each RIP instance proposes to a collector component an RIP image for printing, and the collector grants permission to image a page to each unique RIP proposed to the collector and then rejects the proposals from other subsequent duplicate RIPs.

BRIEF DESCRIPTION OF THE DRAWINGS

FIG. 1 is a block diagram illustrating the architecture for control and data flow of a printing system formed in accordance with one embodiment of the present disclosure.

DETAILED DESCRIPTION

While the present disclosure will hereinafter be described in connection with alternative embodiments thereof, it will be understood that it is not intended to limit the disclosure to those embodiments. On the contrary, it is intended to cover all alternatives, modifications and equivalents as may be included within the spirit and scope of the disclosure as defined in the appended claims.

The present disclosure addresses the continuing need for faster printing systems, particularly systems where every page can be color and different. The system exploits replicated interpretation to facilitate its speed, but especially an implementation of replication not known in prior art printing systems which had been limited to job parallelism or page parallelism. The subject disclosure uses an intermediate level of replication herein defined as a PDL independent component. Print job data is intended to comprise a collection of rasterizable data of at least one page and not more than one job.

The system includes a language identifier that selects the method by which the print job is RIPped. In addition to the language identifier, the system includes a collection of RIP nodes, RIP instances, or processing nodes which can replicate and translate the PDLs to print-ready form, and a collector that grants permission and reorders completion messages so that pages appear to be completed in the same order they appeared in the original jobs.

Printer performance is constrained by the speed that a DFE can interpret and render (RIP) PDL files. Page parallel RIP can be introduced to handle the RIP performance requirements of 80-110 ppm color printers. Page independent Postscript, VIPP or PDF is split into chunks that are processed by multiple RIP tasks running concurrently on the DFE. Current implementation cannot handle certain PDLs of PDL files that contain page dependent code (I.e. that build an imaging context such that page N can only be correctly interpreted and rendered after pages 1 to N−1). These jobs cannot be split into independent chunks and therefore must be processed by a single RIP task. The present disclosure proposes a method to solve the aforementioned problems. Instead of splitting a PDL into independent chunks, the same PDL file is concurrently interpreted by multiple RIP processes. A 'collector' monitors the progress of each RIP instance, and schedules which pages to render or image in what order. For example, the first RIP process may interpret and image pages 1-N, and the second RIP process may interpret pages 1-M but may image only pages N+1 to M, etc. Alternatively, the first RIP process may interpret and image pages 1, 3, 5, 7 . . . N, while the second RIP process may interpret and image pages 2, 4, 6 . . . N−1; for example, when all pages have equal or similar complexity. The system enables parallel RIP for any PDL type and for PDL files that are not page independent. The collector can accept completed pages in any order and can permit rendering in any order to improve post RIP imposition performance and can be used in parallel RIP systems where RIP tasks execute on one multi-CPU platform or on multiple platforms. The system can also work for spooled or streamed jobs.

With particular reference to FIG. 1, the system 10 may be implemented as a distributed system, or a centralized service on a single multiprocessor machine, for driving a print engine. The disclosure can be implemented in a Front End (i.e. Digital Front End [DFE]) distributed over multiple computational platforms. The DFE can include DFE components (e.g. an input system, a job scheduler, a GUI, etc.); a PDL-independent "replicator" component wherein multiple instances permit the system to process multiple jobs or PDL bytes in parallel; multiple RIP instances for each of the "non-splittable" PDLs to be supported by the DFE; and, a PDL-independent "collector" component wherein multiple collector instances, or single collector instance, permit the system to process multiple jobs in parallel.

Operation of the disclosure in the DFE can be described as comprising the following. The "non-splittable" PDL job, or other job, is received at the DFE. The DFE spawns an instance of the replicator component and attaches it to the job file or stream. The DFE schedules the job to RIP by multiple instances of the RIP appropriate to the job's PDL type. The DFE provides each RIP with job properties, and a pointer to the replicator output; each RIP instance establishes a connection with the replicator and pulls bytes from the PDL to interpret as described hereinafter. Each RIP instance proposes to the collector component that it (i.e. the RIP) image the first page. The collector grants permission to image the first page to the first RIP that the collector observes making a unique proposal and rejects the duplicate proposals made by the other RIPs by granting them permission to image some other specific unique page. The RIP given permission to image a given page first interprets the page, images the page and then (optionally) compresses it before handing the page to the collector component. The RIP(s) not granted permission to image a given page interpret(s) the page with the objective of locating the next page boundary within the PDL as quickly as possible. The RIP will not image the page, so the RIP is free to take shortcuts to find the page boundary that it has been instructed to RIP, without however compromising the internal state of the RIP. Once the RIP has located the page, it begins normal interpretation, imaging and (optional) compression before handing the page to the collector component. Alternately, if implementation considerations preclude interpretation shortcuts, then the RIP performs normal interpretation, without however saving any objects for imaging. The RIP instance then proposes to the collector component that it (i.e. the RIP) image the next page. Execution continues at "collector grants permission to image" as described above and proceeds with the steps thereafter; and, when the RIP instance given permission to image the final page of the PDL (as evidenced by the last byte being read from the replicator), the RIP informs the collector that the job is complete. The other RIP instances simply end their job processing without further interaction with the collector when encountering the final job byte.

Each of the multiple RIPs assigned to process a given job can request permission to image and (optionally) compress a given page. If permission is not granted, the RIP interprets the page as quickly as possible, skips the imaging and (optional) compression steps, and proceeds to the next page. Therefore each of the RIPs interprets the entire PDL file; but only images and (optionally) compresses a subset of the pages to be printed. Often, imaging and compression times are large when compared with interpretation time. Therefore, the disclosure enhances system performance even though the PDL is redundantly interpreted.

The disclosure provides for the collector which can accept completed pages in any order, so pages that take a long time to image do not hold up other pages. The disclosure has virtually no impact on "First Copy Out Time", unlike alternate strategies that rely on conversion of the non-splittable PDL file. Neither the replicator nor the collector need PDL-specific knowledge. The disclosure works equally well for RIPs executing on multiple cores of a single computational platform, or multiple cores of multiple independent computational platforms. The system works equally well for jobs which are completely spooled to the DFE prior to initiation of RIP, or jobs which stream into the DFE and are RIPped as the PDL is being received (i.e. the PDL type and job construction is amenable to conventional serial-RIP streaming).

The system can be utilized in DFEs implementing a post-RIP imposition feature. The collector can interact with a DFE's imposition layout component to establish which logical pages are to be imposed on which sheet sides. Instead of providing permission to image a single page, the collector can provide permission to image a list of pages (i.e. this list can be the set of logical pages to be imposed on a sheet side). These pages need not be sequential. Instead of imaging a single page and then requesting permission to image another, the RIP images all of the pages in its permission list prior to requesting permission once again. In the case of a non-sequential list of pages in the permission list, the RIP will interpret the "missing" pages as quickly as possible to arrive at a page that needs to be imaged. Once the pages in the list have been imaged; the pages are imposed into a sheet side image. Once the sheet side has been imposed, it is passed to the collector component (instead of individual pages, as in the non-imposition case.)

The above mechanism can be used for imposition layouts that do not require advance knowledge of the number of pages in the job. For layouts where this advance knowledge is required, the collector behaves as it does for non-imposed jobs. Once all pages have been RIPped and imaged (and "N" is known), the imposition step can be performed.

There are other advantages in using this disclosure. For example, consider a DFE distributed over multiple computational platforms, where there are multiple platforms configured to drive video to multiple print engines comprising the press. In this case, it might be advantageous to use the disclosure to cause the system to image pages on the computational platform where they will ultimately be needed, instead of transferring uncompressed, potentially high resolution (e.g. 1200×1200 spi) images, between the single platform performing the imaging operation and the computational platforms driving video to the print engines.

Referring again to FIG. 1, operation of the disclosure in the DFE can be described as comprising the following. The "non-splittable" PDL job 12, or other job, is received at the DFE. The DFE spawns an instance of the replicator component 14 and attaches it to the job file or stream. The DFE schedules the job to RIP by multiple instances of the RIP 16, 18 appropriate to the job's PDL type 17, 19. Although FIG. 1 illustrates two RIP instances, it is to be appreciated that the disclosure is not limited to two RIP instances. The DFE provides each RIP 16, 18 with job properties, and a pointer to the replicator output; each RIP instance 16, 18 establishes a connection with the replicator 14 and pulls bytes from the PDL 17, 19 to interpret as described hereinafter. Each RIP instance 16, 18 proposes 20, 30 to the collector component 24 that it (i.e. the RIP) image a page 21, 31. The collector 24 grants permission 22 to image a first page 21 to the first RIP 16 that the collector 24 observes making a unique proposal 20 and rejects the duplicate proposal 30 made by the other RIP 18 by granting permission 32 to image some other specific unique page 31. The RIP given permission 22 to image a given page first 21 interprets the page 26, images the page 27 and then (optionally) compresses 28 it before handing the page 21 to the collector component 24. The RIP(s) not granted permission to image a given page, utilize 'fast' interpret(s) 29, 39 of the remaining pages with the objective of locating the next page boundary within the PDL as quickly as possible. The RIP 18 will not image the page 21, so the RIP 18 is free to take shortcuts to find the page boundary that it has been instructed to RIP, without however compromising the internal state of the RIP. Once the RIP 18 has located the next page 31 it has permission to image, it begins normal interpretation 36, imaging 37 and (optional) compression 38 before handing the page 31 to the collector component 24. Alternately, if implementation considerations preclude interpretation shortcuts, then the RIP 18 performs normal interpretation, without however saving any objects for Imaging. The RIP instance 18 then proposes to the collector component 24 that it (i.e. the RIP) image the next page. Execution continues at "collector grants permission to image" as described above and proceeds with the steps thereafter; and, when the RIP instance 16, 18 given permission to image the final page of the PDL (as evidenced by the last byte being read from the replicator 14), the RIP informs the collector 24 that the job is complete. The other RIP instances simply end their job processing without further interaction with the collector 24 when encountering the final job byte.

It is to be appreciated that each of the multiple RIPs 16, 18 assigned to process a given job can request permission to image and (optionally) compress a given page. Thus, each of the RIPs 16, 18 interprets the entire PDL file 12; but only images and (optionally) compresses a subset of the pages to be printed.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

What is claimed:

1. A printing system comprising:
   a printer;
   a plurality of processing nodes, each processing node being disposed for processing a job file associated with a print job into a printer dependent format;
   wherein the print job includes a non-splittable PDL file;
   wherein the processing nodes each begin processing the print job when a processing manager starts sending the job file to the processing nodes whereby waiting for splitting of the print job into subparts of the print job before RIP processing starts is obviated;
   a replicator component is attached to the job file and replicates said entire print job wherein said job file includes multiple instances of a duplicate raster image processing (RIP);
   said job file includes instructions to execute said multiple instances of said same RIP;
   each RIP instance proposes to a collector component that said RIP image a page for printing;

said collector grants permission to image said page to a first RIP proposal observed to said collector and then rejects the duplicate said page proposals from other RIP components; and, wherein each of the RIPs interprets the entire PDL file and only images a subset of the pages to be printed.

2. The system as defined in claim 1, wherein said collector grants permission to image another page to another RIP proposal observed to the collector and then rejects the same said another page proposals from the other RIP components.

3. The system as defined in claim 2, wherein said RIP given permission to image said page to said first RIP proposal observed, interprets said page, and images said page.

4. The system as defined in claim 3, wherein yet another RIP not given permission to image said first RIP proposal observed, or said another RIP proposal observed, is granted permission to image yet another page to yet another RIP proposal observed, interprets said yet another page, and images said yet another page.

5. The system as defined in claim 1, wherein a RIP given permission to image a last page, interprets said last page, images said last page and informs the collector that said print job is complete.

6. The system as defined in claim 5, wherein other duplicate RIP instances end their respective job processing without proposing to the collector any another images for printing from same said job file.

7. The system as defined in claim 1, wherein each processing node being disposed for interpreting the entire print job into a printer dependent format.

8. The system as defined in claim 1, wherein the printing system comprises a network-based system.

9. A printing system comprising:

a printer;

a plurality of processing nodes, each processing node being disposed for processing a job file associated with a print job into a printer dependent format;

wherein the print job includes a non-splittable PDL file;

wherein the processing nodes each begin processing the print job when a processing manager starts sending the job file to the processing nodes whereby waiting for splitting of the print job into subparts of the print job before RIP processing starts is obviated;

a replicator component is attached to the job file and replicates said entire print job;

said job file includes multiple instances of a duplicate same raster image processing (RIP);

said job file includes instructions to execute said multiple instances of said same RIP;

each said same RIP instance proposes to a collector component an RIP image for printing;

said collector grants permission to image a page to one of said same a RIP proposed to the collector and then rejects other proposals from other subsequent duplicate same said RIPs;

wherein the rejection includes granting permission to image another page of another unique RIP proposed to the collector; and, wherein each of the RIPs interprets the entire PDL file and only images a subset of the pages to be printed.

10. The printing system of claim 9, wherein the permission includes multiple images at a time.

11. The system as defined in claim 10, wherein a job file is an entire job file.

12. The system as defined in claim 10, wherein said RIP is not given permission to image said page, interprets said another page, and images said another page.

13. The system as defined in claim 12, wherein said RIP given permission to image a last page, interprets said last page, and images said last page and informs the collector that the print job is complete.

14. The system as defined in claim 9, wherein said RIP given permission to image said page, interprets said page, and images said page.

\* \* \* \* \*